United States Patent
Morokhovskyi

(10) Patent No.: US 7,573,315 B2
(45) Date of Patent: Aug. 11, 2009

(54) CONTROL DEVICE AND METHOD OF OPERATING THE CONTROL DEVICE HAVING CONTROLLER CHIPS AND CHANGE-OVER UNIT

(75) Inventor: Victor Morokhovskyi, Erlangen (DE)

(73) Assignee: Areva NP GmbH, Erlangen (DE)

( * ) Notice: Subject to any disclaimer, the term of this patent is extended or adjusted under 35 U.S.C. 154(b) by 231 days.

(21) Appl. No.: 11/810,078

(22) Filed: Jun. 4, 2007

(65) Prior Publication Data

US 2007/0270979 A1 Nov. 22, 2007

Related U.S. Application Data

(63) Continuation of application No. PCT/EP2005/012898, filed on Dec. 2, 2005.

(30) Foreign Application Priority Data

Dec. 2, 2004 (DE) ........................ 10 2004 058 328

(51) Int. Cl.
*G06G 7/28* (2006.01)
*G05F 1/00* (2006.01)
*G01R 31/02* (2006.01)
*H02H 7/00* (2006.01)
*H02H 9/00* (2006.01)
*G05B 19/18* (2006.01)
*G05B 11/01* (2006.01)
*G05B 13/02* (2006.01)
*G05B 9/02* (2006.01)

(52) U.S. Cl. ........................ 327/334; 327/520; 324/537; 361/18; 700/4; 700/20; 700/21; 700/40; 700/82; 702/58

(58) Field of Classification Search ..................... 700/2, 700/4, 11, 20, 21, 40–43, 79, 82; 702/57, 702/58; 714/100, 1; 324/500, 537; 327/1, 327/334–336, 427, 518–520; 340/500, 825; 361/1, 18
See application file for complete search history.

(56) References Cited

U.S. PATENT DOCUMENTS 4,509,372 A * 4/1985 Mount ..................... 73/861.28
4,730,340 A * 3/1988 Frazier, Jr. .................. 375/150

(Continued)

FOREIGN PATENT DOCUMENTS

DE 1 927 392 6/1971

(Continued)

OTHER PUBLICATIONS

Schuler, Hans: "Prozeβführung", pp. 175-178, 1999.

*Primary Examiner*—Crystal J. Barnes-Bullock
(74) *Attorney, Agent, or Firm*—Laurence A. Greenberg; Werner H. Stemer; Ralph E. Locher

(57) ABSTRACT

A control device contains a plurality of controllers, a common signal output, and a change-over unit. The controllers are coupled on an output side to the common signal output through the change-over unit. A plurality of differentiating elements are disposed upstream of the change-over unit and in each case connected with one of the controllers. An integrating element follows the change-over unit. An output of a controller is first differentiated, sent through the change-over unit, and then integrated.

6 Claims, 2 Drawing Sheets

U.S. PATENT DOCUMENTS

| | | | |
|---|---|---|---|
| 5,008,825 A | * | 4/1991 | Nadkarni et al. ................ 701/4 |
| 5,036,469 A | * | 7/1991 | Pelton ......................... 701/16 |
| 5,148,364 A | | 9/1992 | Scherer |
| 5,324,066 A | * | 6/1994 | Masamura et al. ....... 280/5.519 |
| 5,471,481 A | * | 11/1995 | Okumoto et al. ............ 714/727 |
| 5,736,848 A | * | 4/1998 | De Vries et al. ............ 324/142 |
| 5,777,232 A | * | 7/1998 | Kurita et al. ................. 73/664 |
| 7,019,532 B2 | * | 3/2006 | Glockner et al. ............ 324/543 |
| 7,408,398 B2 | * | 8/2008 | Sander ....................... 327/427 |
| 2004/0046522 A1 | | 3/2004 | Yao et al. |

FOREIGN PATENT DOCUMENTS

| | | |
|---|---|---|
| DE | 3326474 A1 * | 2/1985 |
| JP | 02287274 A * | 11/1990 |

* cited by examiner

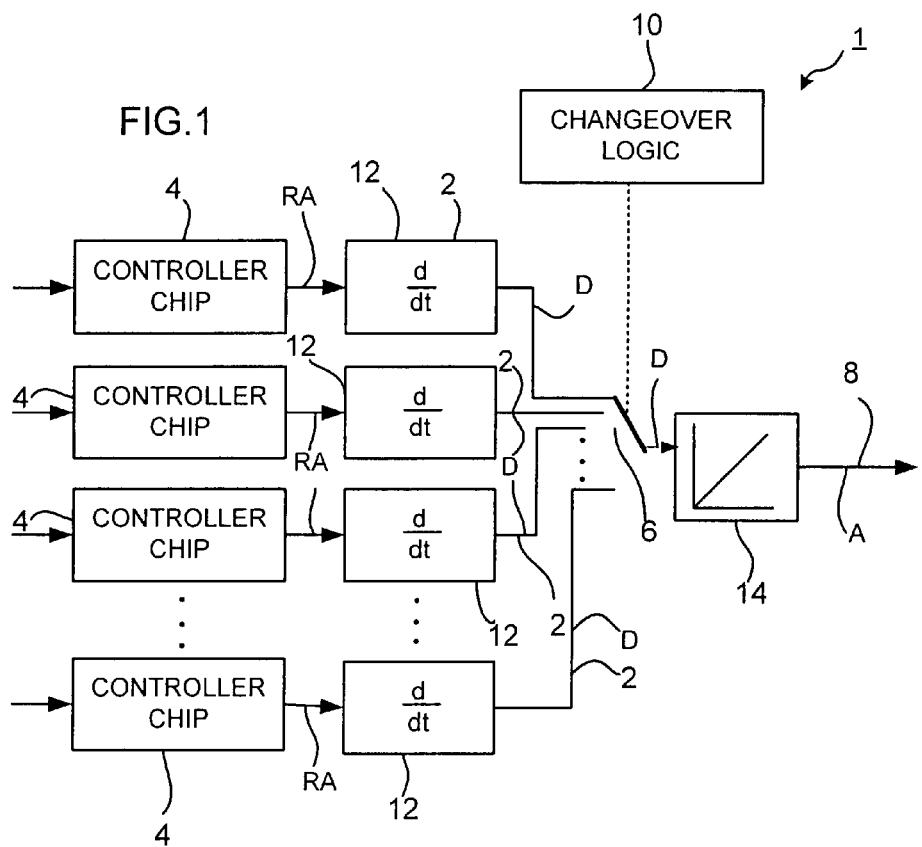
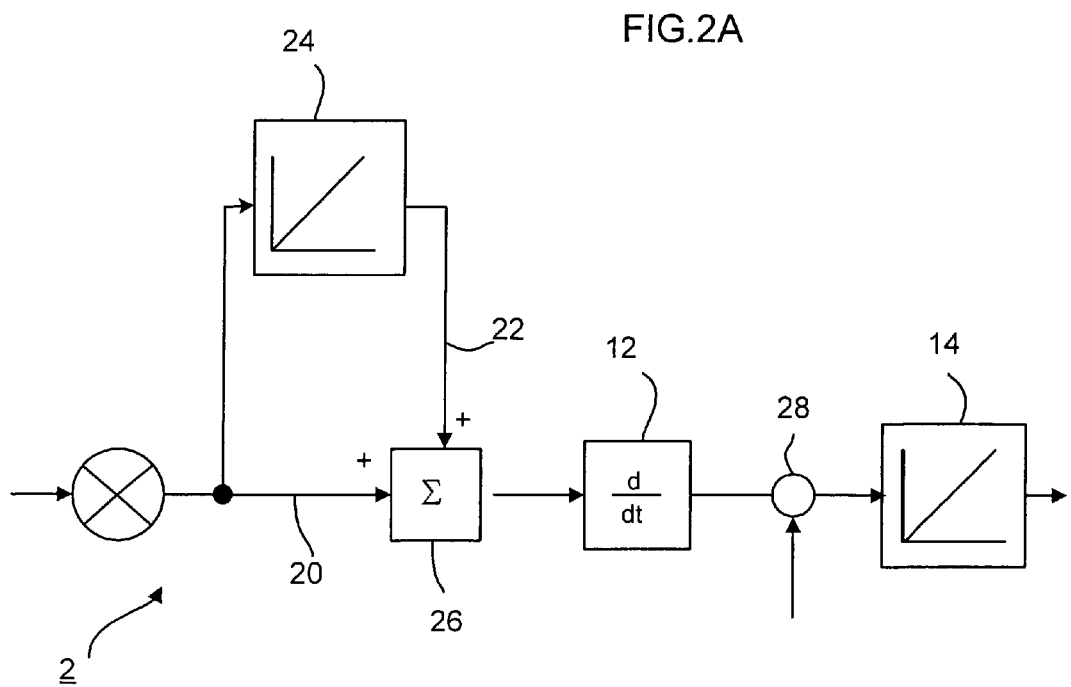

CONTROL DEVICE AND METHOD OF OPERATING THE CONTROL DEVICE HAVING CONTROLLER CHIPS AND CHANGE-OVER UNIT

CROSS-REFERENCE TO RELATED APPLICATION

This is a continuing application, under 35 U.S.C. § 120, of copending international application No. PCT/EP2005/012898, filed Dec. 02, 2005, which designated the United States; this application also claims the priority, under 35 U.S.C. § 119, of German patent application No. 10 2004 058 328.5 filed Dec. 02, 2004; the prior applications are herewith incorporated by reference in their entirety.

BACKGROUND OF THE INVENTION

Field of the Invention

The invention relates to a control device containing a multiplicity of controllers connected on the output side to a common signal output via a change-over unit.

In industrial control devices, a multiplicity of controllers is usually provided, for example for redundancy or safety reasons or also for providing a multiplicity of alternative open-loop or closed-loop control processes, for providing a control signal. These controllers are connected at the output side to a common signal output via a change-over unit, wherein in each case one of the controllers can be selectively selected via the change-over unit to provide the output signal. Depending on the process sequence, it is usually predetermined which of the controllers is to be currently active in a respective operating state. Even the simplest control devices usually have at least two such control channels, predetermined by alternative controllers, which can be selectively selected, wherein a distinction can be made, for example, between the two operating states "automatic control" and "manual control". In such cases, it is also possible to predetermine a value by selective intervention from the outside by selectively selecting the "manual control" channel (also called open-loop control) as an alternative to automatic control. In addition, a large number of alternative control channels, which can differ, for example, with regard to the internal process sequences or individually predetermined operating parameters, within a control device. Finally, a change-over between controllers can also be provided which in each case control different process variables.

During the change-over between different operating modes, in such a control device the controller which happens to be currently active is separated from the signal output by operating the change-over unit and an alternative controller is connected on the signal output. Due to operating conditions, however, it is not always possible to ensure for such a change-over, that the controller to be switched off and the controller to be newly activate have exactly the same output signal at the change-over time. Such signal differences may even be comparatively large since the controller to be newly activate is not in a closed control loop at the time of change-over and, therefore, may have the tendency of "running away" to a limit position. Signal deviations occur especially if different controlled variables are allocated to the controllers. If such a signal deviation between controllers occurs during the change-over, the output signal produces a so-called signal jump during the change-over. Such signal jumps can be very undesirable with regard to operating requirements or possible stability criteria.

To provide for a so-called smooth change-over in order to avoid such a signal jump during the change-over between various controllers, which guarantees distinctly increased control-related reliability of the control device overall, the concepts of "relieving" or of "synchronization" can be provided, in principle. In the case of "relieving", outputs of the individual controllers are not switched but forwarded to the output channel via a minimum or maximum element. In such a circuit, the change-over is always smooth. However, the application of such a concept is comparatively greatly restricted since the minimum or maximum element at the signal output completely defines the change-over rule. Implementing a change-over in accordance with any desired rule which is neither minimum nor maximum is not possible in this arrangement. In addition, the concept of "relieving" is too slow in most cases of control applications since the "relieving" controller must pass through a "distance" until the relief can take place. For this reason, the concept of "relieving"is not widely used especially in industrial applications of control devices.

As an alternative, the so-called "synchronization" can be used which allows a change-over in accordance with any criterion, formed by the so-called "change-over logic". In such a circuit, the output signal of a first controller can be switched as an additional input signal to an alternative controller to synchronize the alternative controller during the whole process. However, such a circuit requires the mutual application of the output signals of all other controllers to all controllers. For this reason, such a concept exhibits a particularly high complexity, especially when a multiplicity of controllers are used, which can result in a particularly high production or planning expenditure.

In addition, the concept of synchronization is associated with the disadvantage that a "zero signal" is output for a short time during the change-over especially when implemented in analog technology. Such a change-over is thus not smooth in the narrow sense, at least in an analog application.

In the case of an alternative application in a digital embodiment, each individual synchronization circuit represents a signal loop which cannot be timeless in digital technology. However, such signal loops have disadvantages in digital technology since it is not only the correctness of interconnection but also the propagation time of the synchronization signals which must be taken into consideration especially in the planning. This problem can be made more difficult if a number of processors are used which run asynchronously with respect to one another. Thus, this concept can only be used to a limited extent especially in complex control systems.

BRIEF SUMMARY OF THE INVENTION

It is accordingly an object of the invention to provide a control device and a method of operating the control device which overcome the above-mentioned disadvantages of the prior art devices and methods of this general type, by which a smooth change-over between individual controllers is made possible with particularly simple resources and in a reliable manner.

With the foregoing and other objects in view there is provided, in accordance with the invention a control device. The control device contains a plurality of controllers, an output side having a common signal output, and a change-over unit. The controllers are coupled to the common signal output through the change-over unit. A plurality of differentiating elements are disposed upstream of the change-over unit and in each case are connected with one of the controllers. An integrating element is disposed downstream of the change-over unit.

With respect to the control device, the object is achieved, according to the invention, in that the change-over unit is preceded on the input side by a multiplicity of differentiating elements in each case allocated to one of the controllers and followed by an integrating element.

In the invented control device the outputs of the individual controllers to be initially differentiated over time, then changed over and after that integrated over time in order to provide the output signal. The invention do not use a permanent transverse synchronization between individual controllers to avoid signal jumps. Instead, a systematic arrangement common to all controllers should be used. For this purpose, the derivation over time, is first formed from the output signals delivered by the controllers. The change-over can then take place and the inital output signal is restored after the change-over by forming the integral over time. The effects of differentiation and of the subsequent integration substantially cancel and the output signal does not exhibit a jump during the change-over since it is not the signal itself but its derivative which is switched. In the case of such a change-over, deviations between the individual controller channels or the controllers can only lead to a discontinuity in the derivative over time of the output signal, but this is not associated with a discontinuity in the signal itself.

In the configuration of the control device, an individual differentiating element kept separate can be allocated to each controller. However, one or each of the differentiating elements can advantageously be comprised into its in each the corresponding controller. In this way, the controller including its associated differentiating element can be utilized as separate component in the manner of a modular configuration and connected directly to the subsequent change-over unit.

In the case of a PI controller (proportional integral controller), which is widely used, as a controller element a differentiating element can be advantageously comprised. In this case the controller will contain a proportional branch and a differential branch which are connected on the output side to a common summing element. In such an embodiment, the sum of a proportional component and a differential component of the control signal is thus formed within the controller chip. During the integration of the signal overtime following the change-over, a signal will consist of an integral component (formed from the proportional component previously contained) and a proportional component (formed from the differential component previously determined) is thus produced as output signal so that the conventional characteristics of the output signal of a PI controller are obtained.

According to the method, the change-over unit receives the derivative over time of an output signal of a controller as input signal, on the output side of the change-over unit, the output signal of the control device is generated by integration over time.

The differential signal is generated by derivation over time of the output signal of a controller. In an alternative, advantageous embodiment, the differential signal is formed by summing a first signal contribution formed by the derivation over time of an input signal and a second signal contribution proportional to the input signal. After the integration over time PI controller characteristic will be obtained.

The advantages achieved by the invention particularly consist in that, due to the differentiation over time of the controller signals followed by integration over time, a substantially unchanged output signal is generated in the end effect, in which differentiation and integration cancel one another. Due to the change-over element connected between the differentiation over time and the integration over time, a jump in the signal is reliably prevented during the change-over since it is not the signal but its derivative which is switched. This provides a really smooth change-over between the controllers with particularly simple resourses and without additional complexity in the interconnection of the controllers with one another. Due to the comparatively simple concept, there are no further restrictions with regard to the type of controllers used or of the change-over criteria. In particular, it is not required to equip the controllers with a synchronization function. In addition, no signal loops are required in the interconnection, the controller configuration being basically rapid, and arbitrary linear, nonlinear and/or adaptive controllers can be used as controller elements.

Other features which are considered as characteristic for the invention are set forth in the appended claims.

Although the invention is illustrated and described herein as embodied in a control device and a method of operating the control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a block circuit diagram of a control device according to the invention;

FIGS. 2A and 2B are is a block circuit diagrams each showing a controller and

DESCRIPTION OF A PREFERRED EMBODIMENT OF THE INVENTION

Figure 2B:
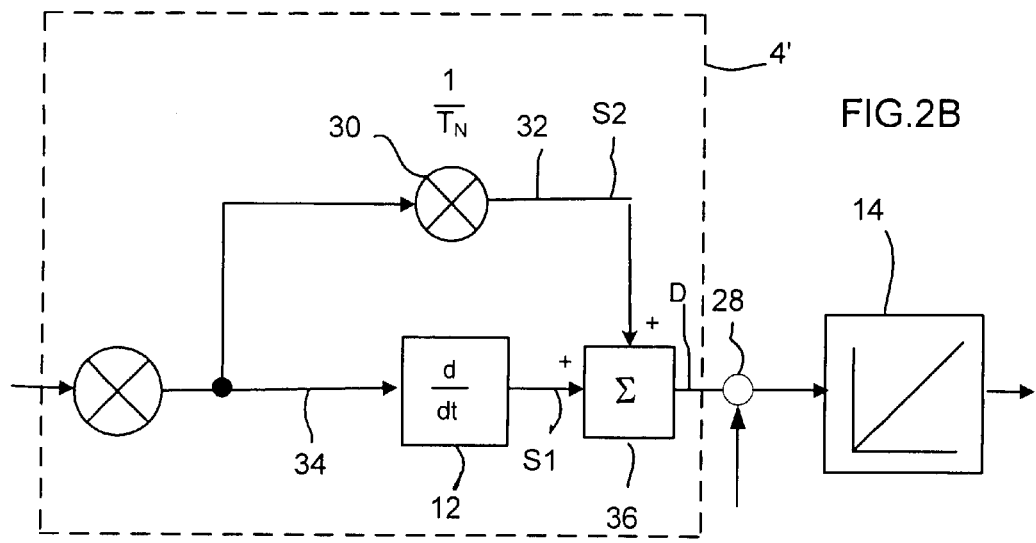

Identical parts are provided with the same reference symbols in all figures. Referring now to the figures of the drawing in detail and first, particularly, to FIG. 1 thereof, there is shown a control device 1 that includes, in the manner of a multi-channel embodiment in which a multiplicity of control channels 2 a multiplicity of controllers 4 and are connected on the output side to a common signal output 8 via a change-over unit 6. The change-over unit 6 is driven by change-over logic 10. Due to its multi-channel configuration, the control device 1 is particularly suitable for industrial applications in which alternately one of the controllers 4 is to be active in dependence on requirement and/or operating mode. It could be provided, for example, that one of the controllers 4 is used for manual intervention from the outside in the manner of manual control (also called open-loop control), wherein the remaining controllers 4 provide automated process control, possibly in accordance with sequence patterns deviating from one another or the like.

The control device 1 is designed for particularly high operating reliability and operational stability. This takes into account, in particular, that the controllers 4, due to intrinsic characteristics or due to different controlled variables and control functions or due to the fact that controllers which are not engaged have a tendency to "run away", generate at their outputs different signals as a result of which it comes to signal jumps at the signal output 8 with a direct change-over between individual controller channels 2 or controllers. To avoid such unwanted signal jumps which, for example, could lead to excitation of unwanted or inadmissible oscillations in the control loop, the control device 1 is designed for so-called smooth change-over in which such signal jumps could be eliminated.

To achieve this by particularly simple method, each control channel 2 in the control device 1 is in each case provided with a differentiating element 12 which is allocated to the respective controller 4 and is connected between the latter and the change-over unit 6. In addition, the change-over unit 6 is followed by an integrating element 14.

In this circuit, the output signal RA output by the respective controller 4 in each controller channel 2 is first differentiated over time in the respective associated differentiating element 12 and during this process is converted into a differential signal D. The differential signal D is then applied to the change-over unit 6 where a change-over can occur between individual controller channels 2, if necessary. The change-over unit 6 forwards the signal D from the choosen controller channel. This forwarded differential signal D is then integrated over time in the subsequent integration element 14. The result of this operation is delivered to the signal output 8 as output signal A. In this operating mode of the control device 1, the differentiation and subsequent integration of the output signal RA of the respective controller 4 cancel so that the output signal A generated by the control device 1 substantially remains unchanged after these operations. The change-over between the controller channels 2 in the change-over unit 6 is carried out not on the output signal RA of the controller 4 but on its derivative over time represented by a differential signal D. Thus, the different values of the output signals RA of the controllers 4 do not have any effect and the output signal A does not exhibit a jump during the change-over. The change-over is thus smooth.

In principle, the concept based on the change-over of the derivative over time of the output signal RA of the controllers 4 with integration over time taking place after the change-over does not necessitate any restrictions with regard to the type of controllers used or the change-over criteria. In particular, it is not required that the controllers 4 to be changed over must have synchronization functions or the like. In particular, the widely used controllers of the type P (proportional), I (integral), PI, PD (proportional differential), PID or also any linear, non-linear or adaptive controllers can be changed over smoothly with particularly little device and design expenditure, without requiring signal loops. In addition, the controllers between which change-over is effected do not even need to be of the same type. Instead, they can even control different process variables in each case. For example, one of the controllers could be a current controller and another controller could be a voltage controller.

The controllers 4 can be PI (proportional-integral) controllers as is shown diagrammatically and illustratively in FIG. 2A. In this configuration, the controller 4 contains a proportional channel 20 and an integral channel 22 which is connected in parallel on the input side, into which an integrating element 24 is connected. On the output side, the proportional channel 20 and the integral channel 22 are connected to a common summing element 26 in which the sum of the two part-signals is formed. This is followed at the output side by the differentiating element 12 which, is connected at the output side to the change-over unit 6 as indicated by the change-over point 28. With a corresponding "active" setting in the change-over unit 6, the controller channel 2 thus formed is connected to the subsequent integrating element 14. In the case of a configuration according to FIG. 2A, the controller 4 disposed in conventional PI construction is thus connected to the differentiating element 12, essentially kept separately, for forming the respective controller channel 2.

A system which is equivalent with regard to its control characteristics can be provided by including the differentiating element 12 into the controller 4 allocated to it in each case. An exemplary embodiment of such an arrangement is shown by a PI controller in FIG. 2B. The controller 4 provided with the differentiating element 12 contains, on the one hand, a proportional branch 32 provided with a proportional element 30 and, on the other hand, a differential branch 34 provided with a differentiating element 12. The outputs of the proportional branch 32 and of the differential branch 34 are connected to a common summing element 36. In this embodiment, the differential signal D represents the derivative over time of the output signal RA of the controller 4 is thus formed by summing a first signal contribution S1, formed by the derivative over time of a controller input signal, and a second signal contribution S2 proportional to the controller input signal. The differential signal D thus output is supplied to the change-over unit 6 shown as the change-over point 28 in accordance with the embodiment described above and is forwarded to the subsequent integrating element 14 in dependence on requirement and operating mode.

Figure 3:
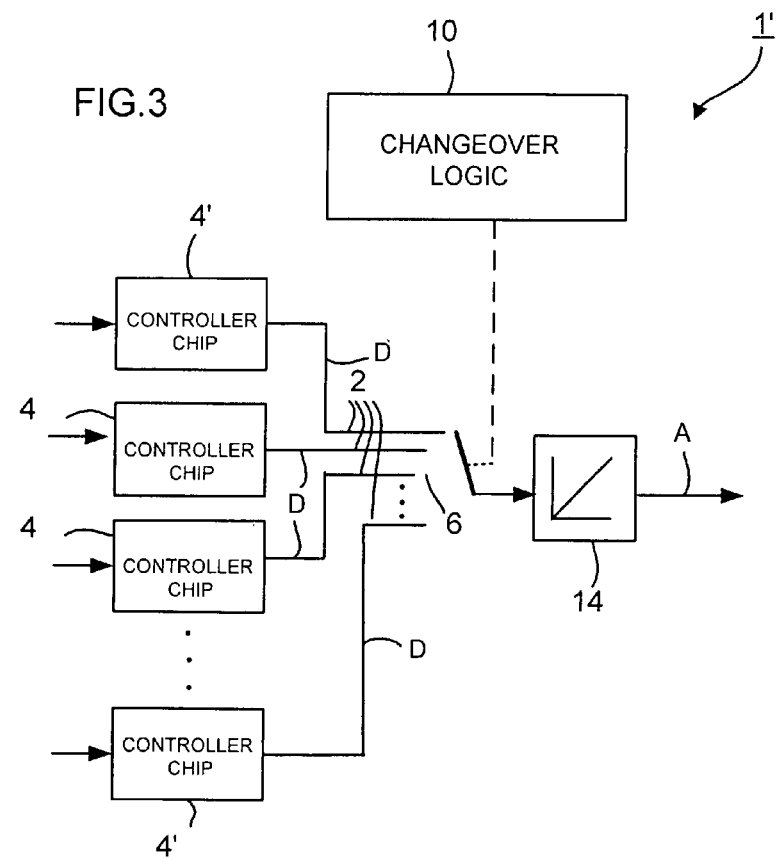
FIG. 3 is a block circuit diagram of an alternative embodiment of a control device.

FIG. 3 shows an exemplary embodiment of a control device 1' formed from such controller 4' in each case already provided with a comprised differentiating element. Retaining the concept that the change-over between controller channels or controllers is to take place with regard to the derivative of the controller signal, wherein a subsequent integration over time is provided, the controllers 4', supplying a differential signal D as output, are directly connected to the change-over unit 6 in this embodiment. The change-over unit 6, is followed by the integrating element 14 for forming the output signal A.

The invention claimed is:

1. A control device, comprising:
    a plurality of controllers
    an output side having a common signal output;
    a change-over unit, said controllers coupled to said common signal output through said change-over unit;
    a plurality of differentiating elements disposed upstream of said change-over unit connected with each of said controllers; and
    an integrating element disposed downstream of said change-over unit.

2. The control device according to claim 1, wherein at least one of said differentiating elements is integrated into said correspondent controller.

3. The control device according to claim 2, wherein at least one of said controllers with said respective differentiating element comprised therein further includes a common summing element, a proportional branch having a proportional element and a first output, and a differential branch having said respective differentiating element and a second output, said first and second outputs connected to said common summing element.

4. A method for operating a control device containing a plurality of controllers coupled to a common signal output on an output side through a change-over unit, which comprises the steps of:
    supplying the change-over unit with a differential signal being a characteristic of a derivative over time of a controller output signal as an input signal to the change-over unit; and
    integrating over time of the output of the change-over unit resulting in an output signal of the control device.

5. The method according to claim 4, which further comprises generating the differential signal by derivation over time of the controller output signal.

6. The method according to claim 4, which further comprises forming the differential signal by summing a first signal contribution formed by the derivation over time of the controller input signal, and a second signal contribution proportional to the controller input signal.

* * * * *